United States Patent
Brady et al.

(10) Patent No.: US 8,473,130 B2
(45) Date of Patent: Jun. 25, 2013

(54) FOLDING BICYCLE WITH ELECTRIC POWER TRAIN ASSIST

(75) Inventors: Robert Brady, Sarasota, FL (US); Erik Holmen, Sarasota, FL (US); Dave Poirier, Bradenton, FL (US); Glenn Akhavein, Bradenton, FL (US); Richard T. Herbst, Jr., Bradenton, FL (US)

(73) Assignee: Robrady Capital, LLC, Sarasota, FL (US)

( * ) Notice: Subject to any disclaimer, the term of this patent is extended or adjusted under 35 U.S.C. 154(b) by 290 days.

(21) Appl. No.: 12/857,907

(22) Filed: Aug. 17, 2010

(65) Prior Publication Data

US 2012/0043148 A1 Feb. 23, 2012

(51) Int. Cl.
*B60L 11/18* (2006.01)
(52) U.S. Cl.
USPC .............................. 701/22; 280/270; 180/205
(58) Field of Classification Search
None
See application file for complete search history.

(56) References Cited

U.S. PATENT DOCUMENTS

| | | | | |
|---|---|---|---|---|
| 5,915,493 | A * | 6/1999 | Nakayama | 180/206.4 |
| 6,267,401 | B1 * | 7/2001 | De Jong | 280/287 |
| 6,270,103 | B1 * | 8/2001 | Grimm | 280/270 |
| 6,623,023 | B2 * | 9/2003 | Niitsu et al. | 280/278 |
| 2005/0077096 | A1 * | 4/2005 | Kokatsu et al. | 180/205 |

FOREIGN PATENT DOCUMENTS

| | | | |
|---|---|---|---|
| GB | 2249529 A | * | 5/1992 |
| JP | 11059532 | | 3/1999 |
| KR | 100272863 | | 11/2000 |
| KR | 100913501 | | 8/2009 |
| KR | 2020090013026 | | 12/2009 |

OTHER PUBLICATIONS

Folding Handlebars, Document shows a folding handlebar configuration.*
Internet Archive—Folding Handlebars Jun. 9, 2008, Document showing a date of publication more than one year prior to applicant's invention.*

* cited by examiner

*Primary Examiner* — Thomas Tarcza
*Assistant Examiner* — Garrett Evans
(74) *Attorney, Agent, or Firm* — Allen, Dyer, Doppelt, Milbrath & Gilchrist, P.A.

(57) ABSTRACT

The invention is directed to a foldable electric bicycle with power assist having a front portion attached to a rear portion via a central pivot post. The front portion maintains a steering column, handle bar system and a front wheel assembly having a front wheel and an electric power train. The rear portion includes a rear connecting arm to maintain the rear wheel. The central pivot post includes a first end that connects with the front portion and a second end which connects with the rear portion. A peddle assembly connects below the central pivot post and communicates with the rear wheel through a drive chain. A rechargeable battery capable of providing electricity to the electric power train is shaped to fit within a cavity and is located within the central pivot post. The rechargeable battery is positioned proximate the user so as to vertically align with the user's girth.

11 Claims, 12 Drawing Sheets

FOLDING BICYCLE WITH ELECTRIC POWER TRAIN ASSIST

FIELD OF THE INVENTION

This invention is directed to a foldable and portable bicycle having an electric power train which can be engaged periodically throughout a bicycle ride. The foldable bicycle may include a tubular central pivot post capable of rotating to fold the bicycle, which has a sufficient size and dimension to house a battery to provide electricity to the power train.

BACKGROUND OF THE INVENTION

Electric bicycles, also commonly referred to as "e-bikes," constitute a category of bicycle having an electric power source to propel the vehicle, or alternatively assists with peddling. Such electric bicycles have grown in popularity over the past decade, with rapid growth in both Europe and Asia. In fact, such devices have begun to replace motorcycles and mopeds in larger urban areas. Electric bicycles are commonly classified as bicycles in most countries, rather than motor vehicles, such that they are not subject to the same laws and licensure as traditional motor vehicles.

It is estimated that there are roughly 120 million electric bicycles in China, with sales rapidly expanding in both India and the Netherlands. A recent report estimates one million electric bicycles will be sold this year in Europe alone. That same report shows that 300,000 sales of electronic bicycles within the United States this year, which is double the number sold in 2009.

Electric bicycles essentially include a rechargeable battery, electric motor and some form of control. Such control can be an on-off switch, but is usually an electronic pulse width modulation control. Batteries currently used for electric bicycles include lead acid, NiCd, NiMH and Lithium ion batteries. The electric power train of these systems can be power-on-demand, where the motor is activated by a handle bar mounted throttle, or a pedelec system (also known as electric assist), there the electric motor is regulated by pedaling. Both types of systems have sensors that detect pedaling speed, pedaling force, or both. An electronic controller provides assistance as a function of the sensor inputs, the vehicle speed and the required force. Most controllers also provide for manual adjustment.

There exist several limitations in current electric bicycle design. One initial issue is aerodynamics, as increased drag will require a larger amount of peddling and/or use of the batteries—both of which will result in a smaller range. A second related issue is aesthetics, as most electronic bicycles are bulky and not visually appeasing.

A third (and perhaps the most) important consideration is storage of electric bicycles during non-use. Due to the bulky nature of electric bicycles, they are often larger and more cumbersome compared to traditional bicycles. In addition, the very purpose and design of these bicycles is for use in large urban areas, such that users of these bicycles do not have the luxury of outdoor storage (such as in a garage) and have limited space in their homes (often in high rise buildings). Moreover, as the cost of electric bicycles can be high (as they cost up to several thousand dollars), it is often desirable to store these items in a secure location rather than simply tethering them at street level.

There exist very little art relating to design of an electric bicycle that can be reduced in size and then later stored. One rudimentary example is U.S. Pat. No. 6,623,023 issued on Sep. 23, 2003. The patent teaches a two hinge assembly which folds the bicycle about a single axis. However, the battery is stored along the shaft of the bicycle, which positions weight away from the user proximate the steering column which makes the device both awkward and less receptive during use (especially when turning the vehicle). Moreover, the design suffers from both aesthetic and aerodynamic issues.

Accordingly, there is a need in the art of electric bicycles for an aesthetic and aerodynamic design in order to increase the efficiency and range of the device. The design should further reduce the overall size of the electronic bicycle for storage in a small space. Moreover, the design should not compromise or risk user performance during use, or the agility of the electric bicycle.

SUMMARY OF THE INVENTION

The present invention solves many of the limitations found in current electric bicycle technologies. The invention is directed to a foldable electric bicycle capable of folding about a central pivot post such that a handle is formed for larger transport and/or stowage. More specifically, the foldable electric bicycle may include a front portion having a horizontal shaft that maintains a telescoping steering column having a handle bar assembly. The front portion may also include a front wheel assembly having a front wheel and electric power train. The electric power train is preferably positioned within the front wheel and includes a high efficiency electric hub motor. The rear portion may contain a single rear connecting arm that integrally includes rear gears which engage the rear wheel.

The front portion connects via a central pivot post to a rear portion having a rear connecting arm to maintain a rear wheel. This central pivot post preferably includes a top end and a bottom end. The top end connects to a horizontal shaft and includes a top handle portion, and the bottom end connects to the rear connecting arm, a peddle assembly and a bottom handle portion. When folded, the top handle portion and the bottom handle portion create a lockable handle for transport of the foldable electric bicycle.

The invention further includes a rechargeable battery having a sufficient size and dimension to be secured in a cavity within the central pivot post. The rechargeable battery provides power to the electric power train. Preferably assembly of the rechargeable battery within the central pivot post is positioned such that the primary weight of the foldable electric bicycle is vertically aligned proximate with the girth of the user, in order to have improved turning capabilities and improved stability of the electric foldable bicycle.

Positioned below the central pivot post is a peddle assembly having a set of peddles connected to each other via a central pin that includes front gears capable of engaging a drive chain which communicates with rear gears attached to the rear wheel. Preferably, a central computer is positioned just below the handle bar assembly on the telescoping steering column. Such central control computer can have GPS capability and communicates with the rechargeable battery, the electric power train, and any other electronics on or attached to the bicycle. The peddle assembly also includes a peddle assist sensor capable of determining whether a user is rotating the set of peddles to send a signal to the central control computer to engage the electric power train. Positioned above the central pivot post is a sliding seat assembly having gel seat adjustably attached to the top end of the central pivot post via a positioning bar.

The rechargeable battery includes a top plate having an upper lip capable of resting upon the top end of the central pivot post. The top plate further includes a rotatable handle to remove and return the rechargeable battery (and optionally a plurality of gauges). Preferably, the upper lip also includes a key enabled lock that secures the rechargeable battery to the central pivot post.

The handle bar system affixed to the top of the telescoping steering column includes having a pair of cable brakes which communicate with both the front wheel and the rear wheel, as well as a multi-speed throttle which communicates via a wire to the front gear of the peddle assembly and electric hub motor. Optionally, the handle bar system includes a handle bar folding assembly that connects to the center rod. The handle bar folding assembly may include a left handle rod (having a first bumper attached to its distal end) which connects to the center rod through a first spring loaded hinge as well as a right handle rod (having a second bumper also attached to its distal end) that connects to the center rod through a second spring loaded hinge. A release switch positioned on the center rod engages both spring loaded hinges to position and align both handle rods in relation to the center rod.

The invention further contemplates a method of folding a foldable electric bicycle for both transport and later stowage while the bicycle is not in use. The method of folding first includes the step of rotating a front portion about a rear portion through use of a swivel joint located within a central pivot post. Such central pivot post is capable of maintaining a rechargeable battery having a first end that connects to the front portion and a second end which connects to the rear portion. Preferably, the front portion includes a front wheel assembly having a front wheel and electric power train. Likewise, the rear portion includes a rear connecting arm which maintains a rear wheel.

The second step is to pivot a telescoping steering column proximate the front wheel. The telescoping steering column may be attached to the front portion and includes a releasable hinge connector positioned at a bottom end of the telescoping column. Next, the method contemplates stowing a gel seat within a sliding seat assembly positioned on the central pivot post through twisting the sliding seat assembly about the central pivot post and then toggling the seat proximate the rear portion through use of a positioning bar attached to the sliding seat assembly.

Optionally, the method can include two additional steps to help further reduce the size and bulk of the foldable electric bicycle for transport and later stowage. One optional step is reducing a handle bar assembly located on top of the steering wheel column through use of a releasable hinge connector. The contemplated releasable hinge connector has a left handle rod which connects to the center rod through a first spring loaded hinge as well as a right handle rod that connects to the center rod through a second spring loaded hinge. The second optional step includes retracting each retractable footrest positioned within each peddle of a peddle assembly positioned below the central pivot post. Here, each retractable foot rest includes an upper portion and a lower portion both connected to a spring loaded swivel point. Each spring loaded swivel point is capable of simultaneously twisting both the upper portion and lower portion toward the peddle assembly.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overall Components of the Foldable Electric Bicycle

Figure 1:
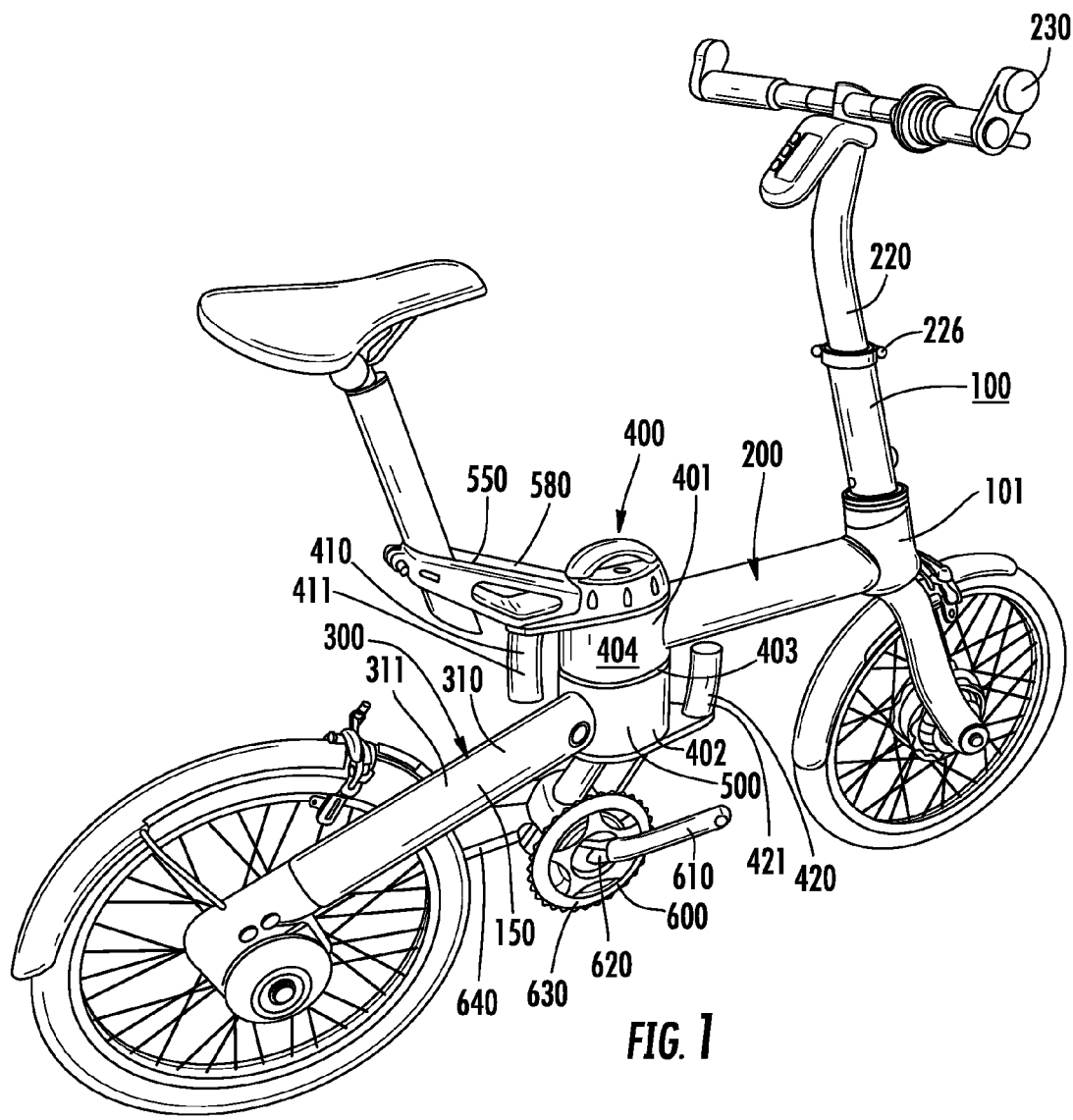
FIG. 1 is a perspective view of the foldable electric bicycle showing both the front portion and rear portion.
Figure 2:
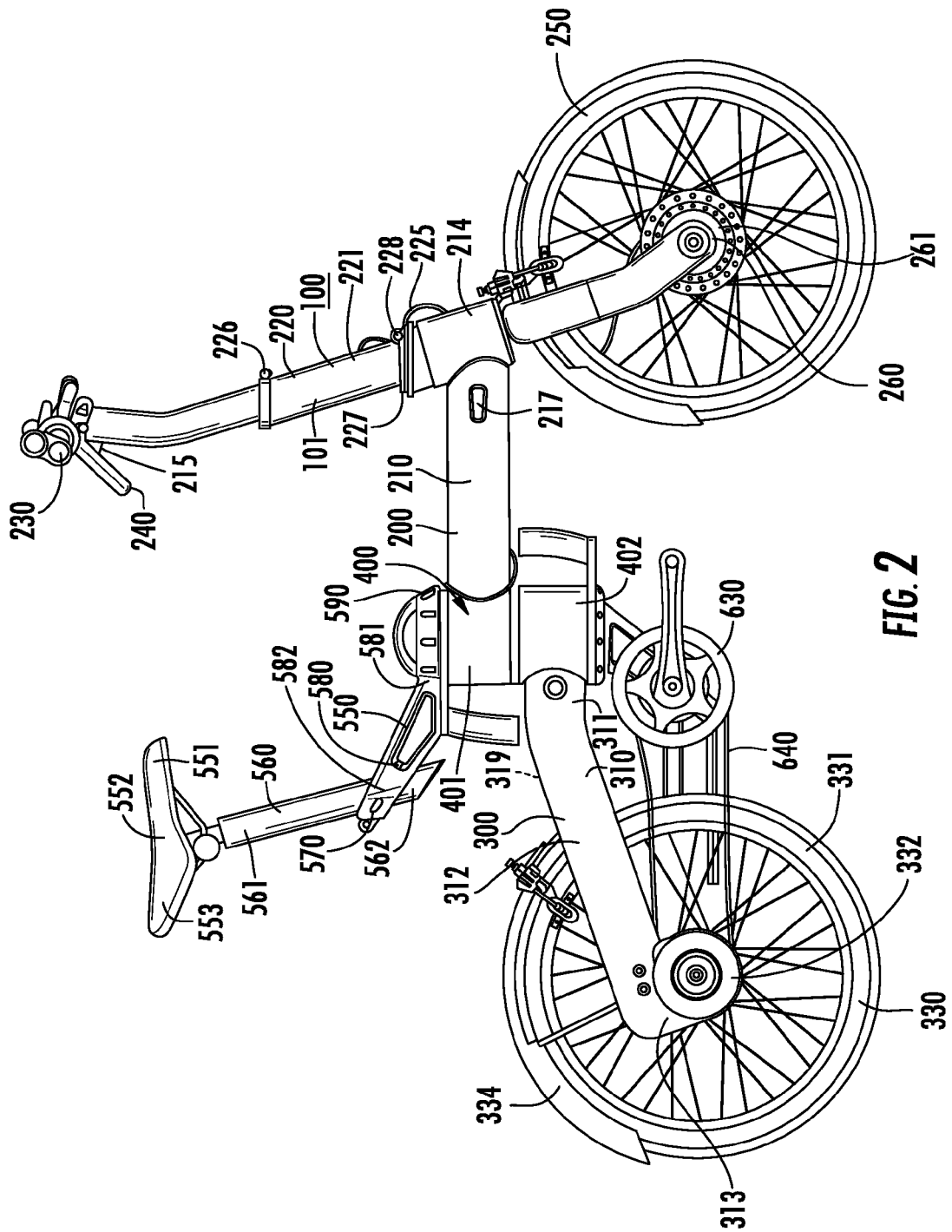
FIG. 2 is a right side view of the foldable electric bicycle illustrating the central pivot post.

Both FIG. 1 and FIG. 2, by way of example, illustrate the salient components 101 of the foldable electric bicycle 100. First turning to FIG. 1, the foldable electric bicycle 100 includes a front portion 200 and a corresponding rear portion 300 which connect through a central pivot post 400. The central pivot post 400 has a top end 401, a corresponding bottom end 402 and a tubular shaft 403 having a sufficient size and dimension to house a rechargeable battery 500.

One desirable feature of the foldable electric bicycle 100 is placement of the rechargeable battery 500, which makes up a large portion of the overall weight of the system. By creating a tubular central pivot post 400, this creates a high strength and durable hub for the entire foldable electric bicycle 100 thereby increasing rigidity (and decrease shearing) of the bicycle frame 150. Moreover, by making the shape of the central pivot post 400 conform to the dimensions of the rechargeable battery 500, the design axially aligns the primary weight of the foldable electric bicycle 100 proximate to the mass of the user. This weight alignment increases overall agility, maneuverability and performance of the foldable electric bicycle 100.

In addition, the central pivot post 400 allows horizontal rotation of the front portion 200 for placement proximate the rear portion 300 to decrease the overall size of the device for storage while not in use. Accordingly, the front portion 200 preferably has a similar length compared to the rear portion 300. Such design considerations help maximize compaction of the foldable electric bicycle 100, while not limiting the overall aesthetics and aerodynamics of the system.

As further shown in FIG. 1, the top end 401 of the central pivot post 400 includes a sliding seat assembly 550. The sliding seat assembly 550 can twist about the central pivot post 400 to stow an attached seat 551. Positioned on the bottom end 402 of the central pivot post 400 is the peddle assembly 600. The peddle assembly 600 includes two sets of pedals 610, the central axis pin 620 which communicates with both pedals 610, a plurality of front gears 630 that radiate from the central axis pin 620, and a drive chain 640 to manually power the foldable electric bicycle 100.

Illustrated in FIG. 2, the front portion 200 of the foldable electronic bicycle 100 includes four primary components 101: a horizontal connecting shaft 210, a telescoping steering column 220 (which includes the handle bar system 230), the central control computer 240 which attaches to the handle bar system 230, and the front wheel assembly 250 (which includes an electric power train 260 having a high efficiency electric motor 261). The horizontal connecting shaft 210 connects the central pivot post 400 to both the handle telescoping steering column assembly 220 and the front wheel assembly 250. Moreover, the horizontal connecting shaft 210 relays breaking directions as well as power directions from the handle bar system 230 and central control computer 240 to the rear portion 300. Such central computer 240 is GPS enabled and includes functionality to determine battery performance, remaining charge, distance traveled, speed traveled, calories burned by the user, as well as provides GPS related information.

Further shown in FIG. 2, the foldable electric bicycle 100 also includes a rear portion 300. Components 101 of the rear portion 300 include a rear connecting arm 310, a precision rear breaking system 320 and a rear wheel assembly 330. The rear connecting arm 310 communicates breaking commands from the handle bar system 230 to the rear wheel assembly 330.

Overall Bicycle Frame Assembly

Figure 3:
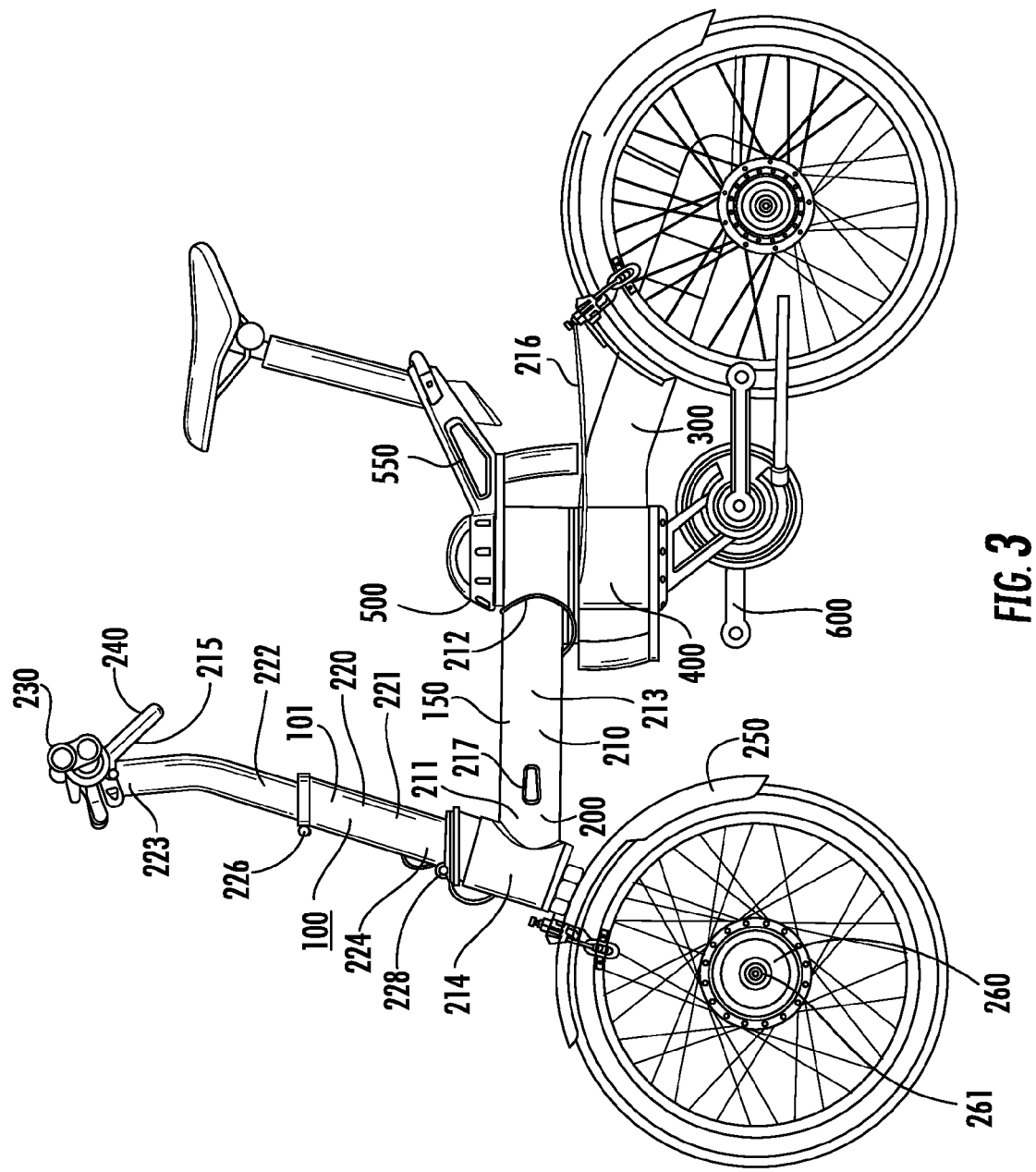
FIG. 3 is a left side view of the foldable electric bicycle illustrating both the front portion and rear portion.

In addition to FIGS. 1 through 2, FIG. 3 illustrates the primary components 101 of the rigid outer bicycle frame 150. As shown, the bicycle frame 150 includes the exterior of the front portion 200, rear portion 300, and the central pivot post 400. The bicycle frame 150 affords a rigid and stable foundation to the foldable electric bicycle 100 that is both aesthetic and aerodynamic. This is accomplished by manufacturing the bicycle frame 150 through either extruded aluminum, composite or related light material. In addition, such bicycle frame 150 also assists in housing the various internal components 101 of the foldable electric bicycle 100 including, for example, the rechargeable battery 500.

Both FIG. 2 and FIG. 3 further illustrate the primary components 101 of the front portion 200. As shown, there are three primary functions for the front portion 200. First, is the ability to steer and maneuver the foldable electric bicycle 100 through combination of the telescoping steering column 220 and handle bar system 230. Second, is providing power to the foldable electric bicycle 100 through use of the electric power train 260 having a high efficiency electric motor 261—when the user reduces (or stops) use of the peddle assembly 600. The third primary function of the front portion 200 is ensuring efficient use of the rechargeable battery 500 through use the central control computer 240.

Horizontal Shaft of the Front Portion

As further shown in FIG. 3, the horizontal shaft 210 includes a front end 211, a corresponding rear end 212 and a tubular midsection 213 made of unibody construction. While the horizontal shaft 210 is preferably made of a lightweight metal such as aluminum, the part can be made of any strong, lightweight, and resistant material known to those of ordinary skill in the art. As shown in FIG. 2, the central pivot post 400 is welded to the rear end 212 of the horizontal shaft 210. Preferably, the central pivot post 400 and horizontal shaft 210 are perpendicularly attached to each other, or preferably the central pivot post 400 is angled slightly toward the telescoping steering column 220 and handle bar system 230.

Positioned at the front end 211 of the horizontal shaft 210 is a front casing 214 designed to attach both the telescoping steering column 220 and front wheel assembly 250. Such front casing 214 is tubular in construction, directly attached/welded to the horizontal shaft 210 and preferably tilted toward the sliding seat assembly 550. Finally, the tubular midsection 213 primarily functions to house the various wires 215 and cables 216 emanating from the handle bar system 230 and the central control computer 240.

Positioned near the front of the midsection 214 is one or more receiving slits 217 of sufficient size and dimension to receive and maintain both the wires 215 and cables 216. In addition, proximate the bottom of the rear end 212 of the mid-section 214 is a distribution slit 218 that positions these various wires 215 and cables 216 into the rechargeable battery 500 and the rear portion 300. Accordingly, both the receiving slit 217 and distribution slit 218 help house and maintain all of the necessary wires 215 and cables 216 within the midsection 214 necessary for communication of the various components 101 within the foldable electric bicycle 100. This helps preserve these various wires 215 and cables 216, and prevents interference or dislodging through use of the foldable electric bicycle 100.

Telescoping Steering Column of the Front Portion

FIG. 3 further illustrates the various components 101 of the telescoping steering column 220. As shown, the telescoping steering column 220 is preferably of two-part construction having a bottom sheath 221 of sufficient size and dimension to hold and secure a bent pipe insert 222. The bent pipe 222 includes both a top section 223 and a corresponding bottom connecting section 224. The top section 223 functions to fasten and perpendicularly maintain the handle bar system 230, as well as affix the central control computer 240 for ready operation, use and view by the user. In contrast, the outer diameter of the bottom connection section 224 is sufficient to engage the bottom sheath 221.

FIG. 2 shows how the bottom sheath 221 includes a top opening 225 having a clamp 226, as well as bottom end 227 that includes a releasable hinge connector 228. When engaged, the clamp 226 squeezes the top opening 225 of the bottom sheath 221 around the bottom connection section 224 to ensure a proper height of the handle bar system 230 for the user. This provides two functions. First, is the ability to customize the foldable electric bicycle 100 to each user and ensure proper grip and use of the handle bar system 230. Second, is functionality to reduce the overall length of the telescoping steering column 220 when stowing and then later storing the device.

Figure 4:
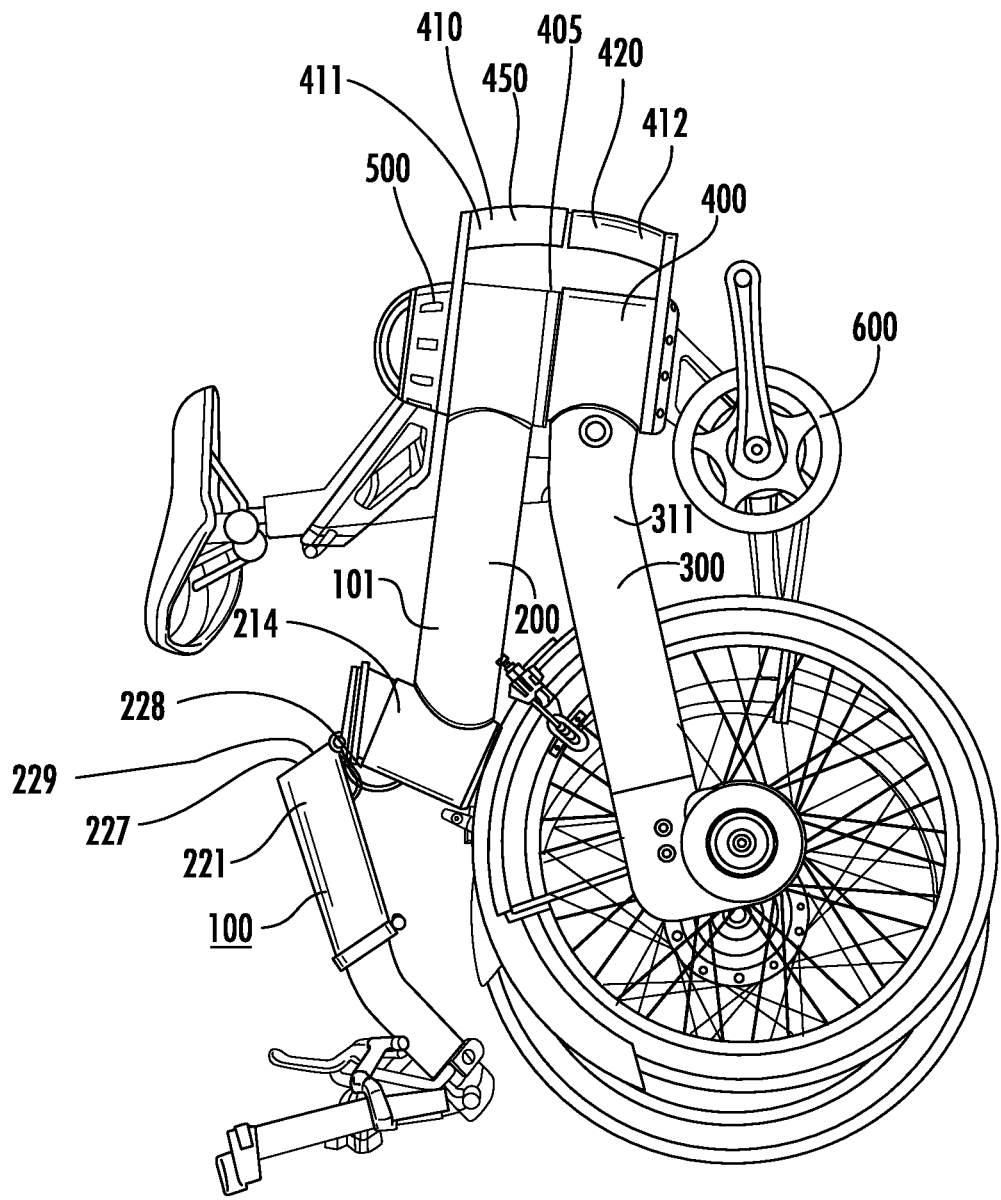
FIG. 4 is a perspective view showing the telescoping steering column and the handle bar assembly.
Figure 5:
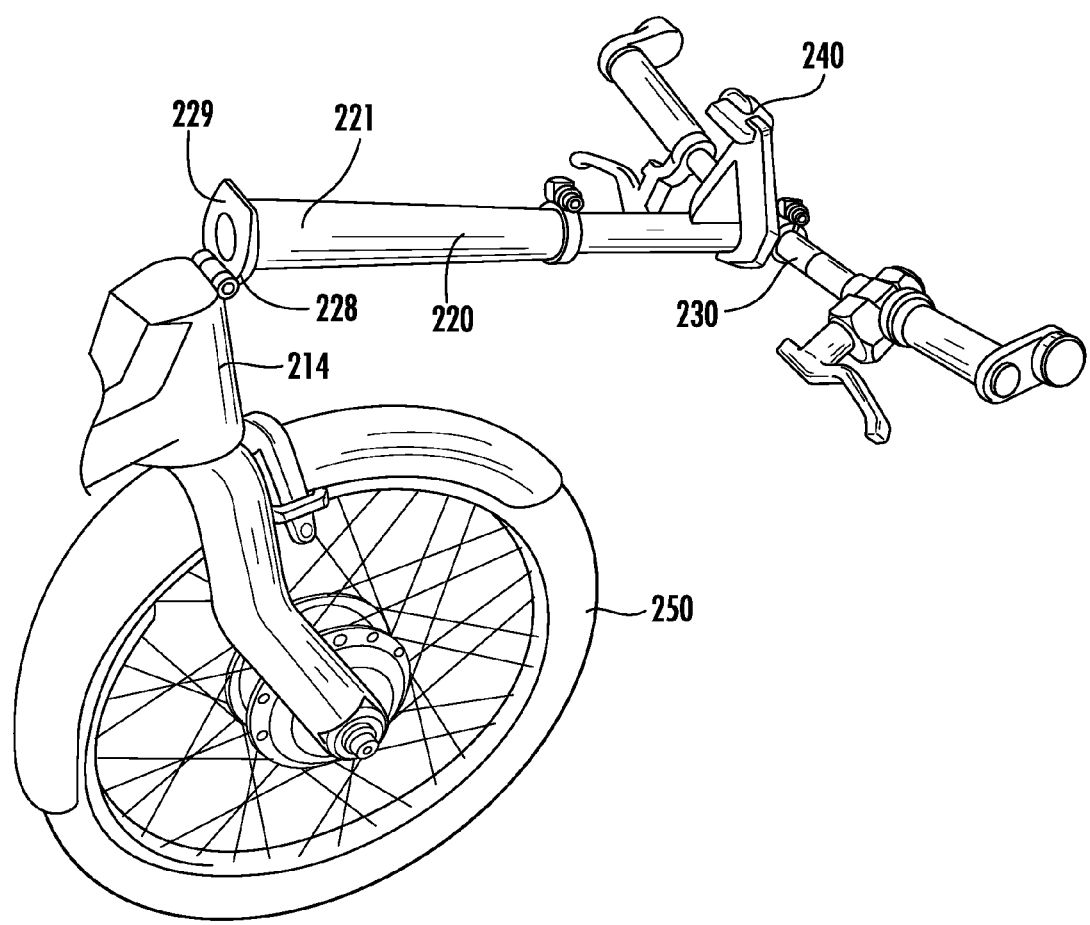
FIG. 5 is a perspective view of the front portion showing the telescoping steering column.

Both FIG. 4 and FIG. 5 illustrate the releasable hinge connector 228 positioned on the bottom end 227 of the bottom sheath 221. As shown in FIG. 4, the releasable hinge connector 228 includes a top plate 229 which when placed in a closed position rests upon a bottom surface proximate the front casing 214. As illustrated in FIG. 5, when the releasable hinge connector 228 is in an open position, then it allows the handle bar system 230 to rest proximate the front wheel assembly 250.

Handle Bar System of the Front Portion

Figure 6:
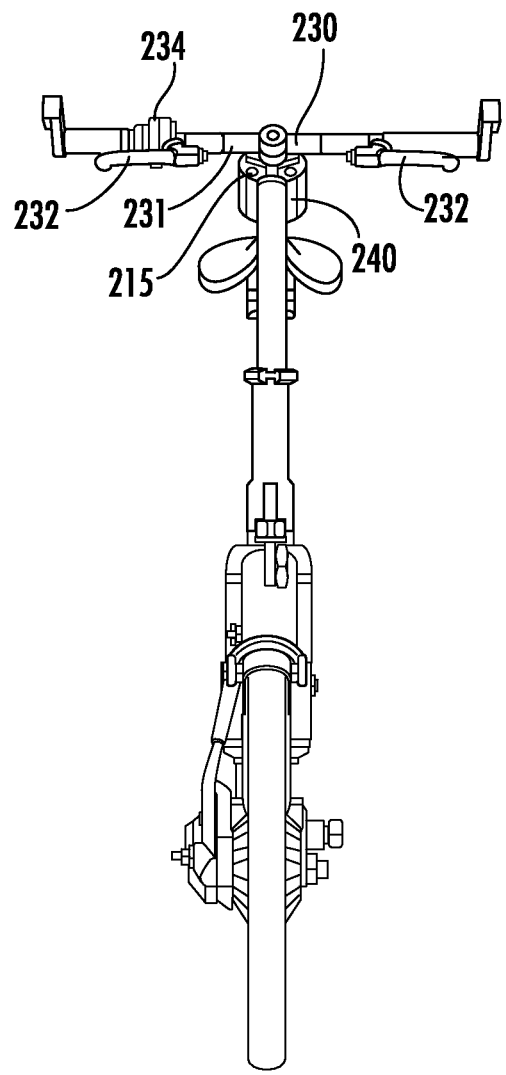
FIG. 6 is a front view showing the handle bar assembly.
Figure 7:
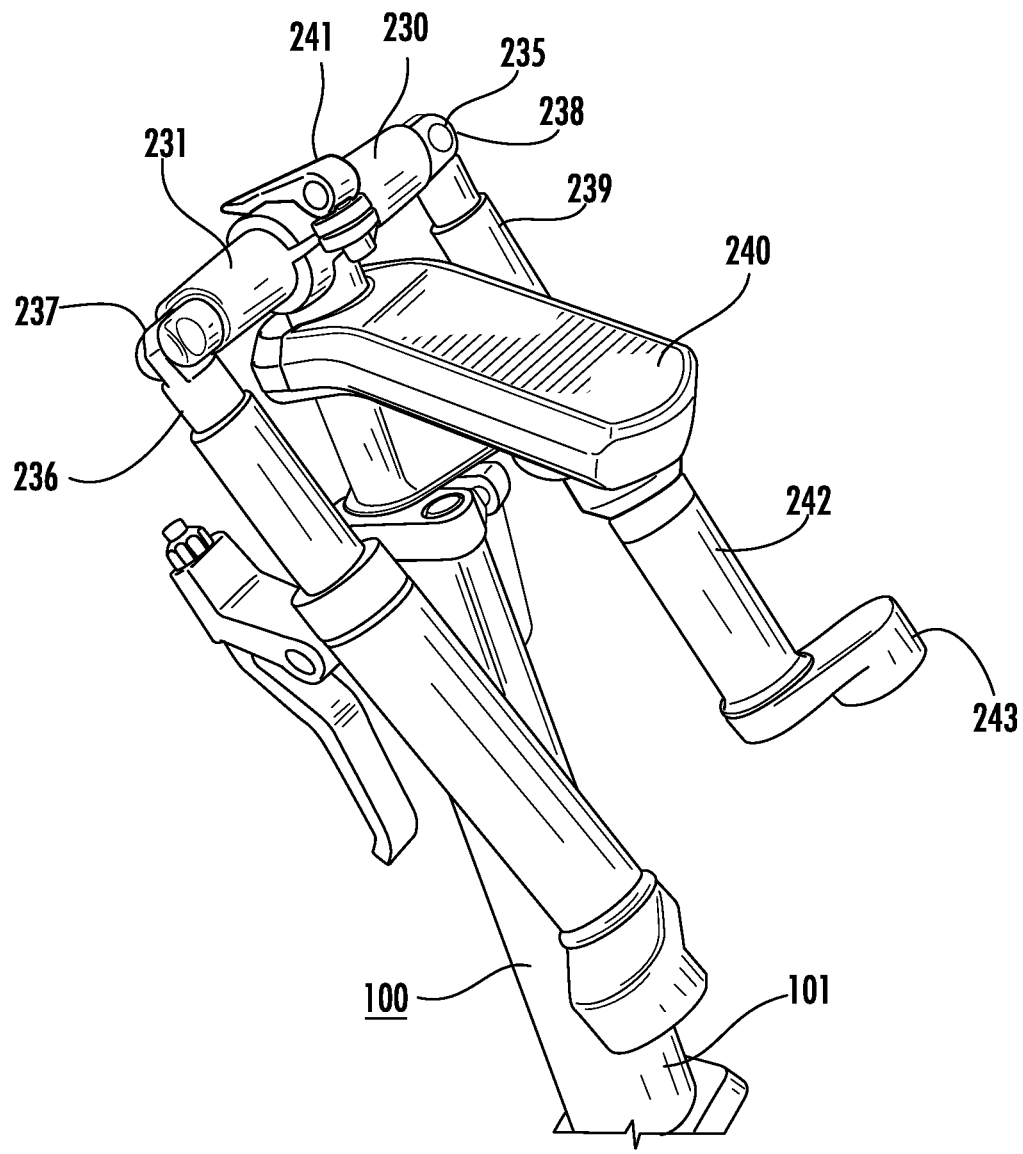
FIG. 7 is a perspective view of the handle bar folding assembly.

FIG. 6 and FIG. 7 both illustrate, by way of example, the preferred structure for the handle bar system 230. First turning to FIG. 6, the handle bar system 230 includes a center rod 231, a pair of cable brakes 232, a flashlight 233 and a multi-speed throttle 234 (which may connect to the central control computer 240 via a wire 215).

As shown in FIG. 7, the handle bar system 230 is preferably foldable to further reduce its size while being stored or transported. This handle bar folding assembly 235 preferably includes a left handle rod 236 which connects with the center rod 231 via a first spring loaded hinge 237. Correspondingly, a right handle rod 238 connects with the center rod 231 through a second spring loaded hinge 239. A release switch 241 can be used to engage both spring loaded hinges 237 and 239 to align with the center rod 213 while the handle bar system 230 is in use by the user.

Preferably, both the right handle rod 239 and left handle rod 236 include soft hand grips 242, preferably made of a sponge like or gel material to help the user maintain a constant hold on the handle bar system 230. Positioned and the distal end of each soft hand grip 242 is a perpendicular side bar 243 (as referred to herein as a "bumper") which functions to provide an additional gripping surface for the user, as well as a resting point for the handle bar system 230 when the foldable electric bicycle 100 is folded for storage.

Front Wheel Assembly of the Front Portion

Figure 8:
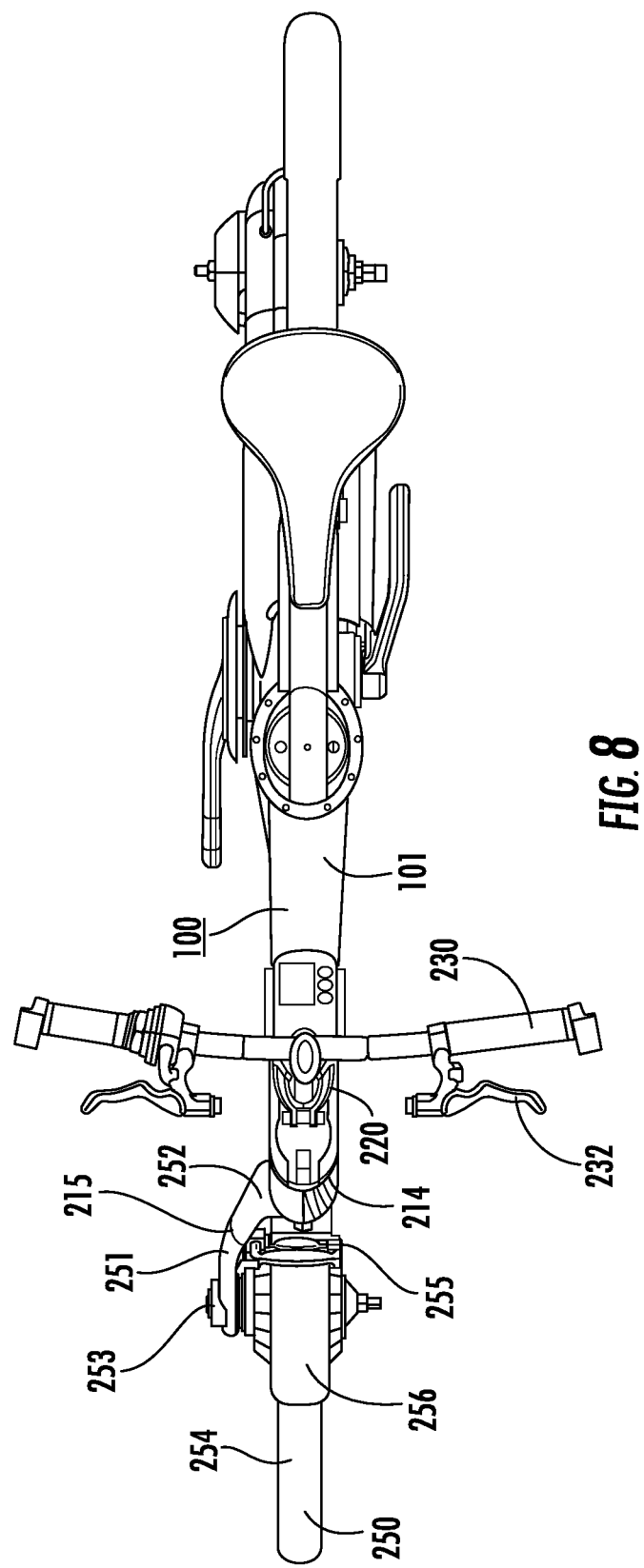
FIG. 8 is a top view of the foldable electric bicycle showing the front wheel assembly including a single rigid coupler arm.
Figure 9:
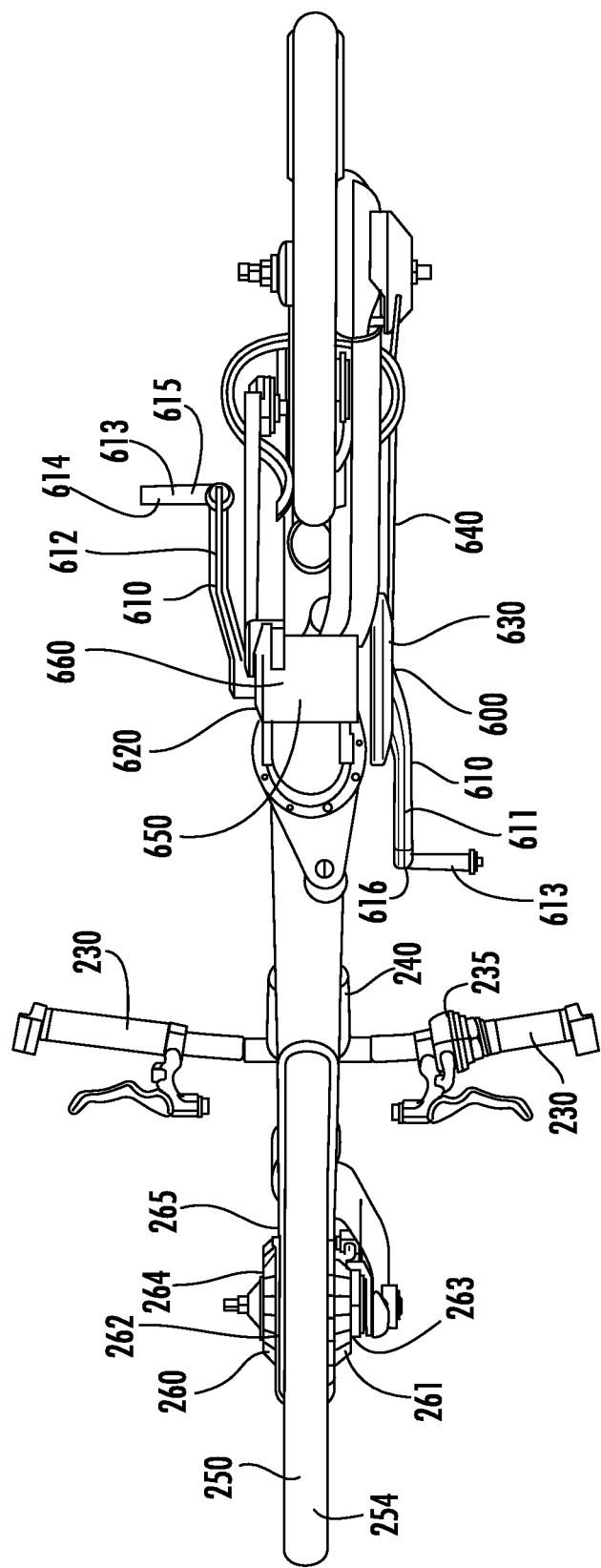
FIG. 9 is a bottom view of the foldable electric bicycle showing the electric power train.

Both FIG. 8 and FIG. 9 show the front wheel assembly 250. First turning to FIG. 8, the front wheel assembly 250 includes a single rigid coupler arm 215 having a top end 252 and corresponding bottom end 253. The top end 252 of the single rigid coupler arm 215 is maintained by the front casing 214. In addition, the top end 252 communicates with the bottom sheath 221 of the telescoping steering column 220 to turn and maneuver the foldable electric bicycle 100. The single rigid couple arm 215 may be slightly curved and is preferably made of extruded aluminum, composite, polymer or similarly strong, lightweight and resilient material known to those of ordinary skill in the art.

As further shown in FIG. 8, the front wheel assembly bottom end 253 houses and maintains the front wheel 254. Proximate the bottom end 253, the design contemplates positioning of a front brake 255, which communicates via cables 216 with the set of cable brakes 232 positioned on the handle bar system 230. Just like with a traditional bicycle, the squeezing of the cable brakes 232 draws up the cables 216 which engages the front brake 255 to the front wheel 254. Optionally, a front splash guard 256 may be positioned proximate the coupler arm bottom end 254 of the single rigid coupler arm 215. Such front splash guard 256 mirrors the curve and dimension of the front wheel 254.

Next turning to FIG. 9, positioned within the front wheel 254 and affixed to the bottom end 253 of the front wheel assembly 250 is the electric power train 260. As shown in FIG. 2 and FIG. 3, the electric power train 260 communicates with the central control computer 240 via a wire 215, which in turn communicates with the multi-speed throttle 235 positioned on the handle bar system 230.

As shown in FIG. 9, the electric power train 260 includes an outer housing 262 having a first side plate 263, a corresponding second side plate 264 which connect to a central housing ring 265. Positioned within the outer housing 262 is a high efficiency electric motor 261 which receives electric power via wires 215 maintained within the horizontal connecting shaft 210 which communicate with the rechargeable battery 500. These wires 265 are fed into the single rigid coupler arm 215 for communication directly to the electric motor 261 maintained within the outer housing 262.

Rear Connecting Arm of the Rear Portion

FIG. 1 and FIG. 2 illustrate, by way of example, the salient components 101 of the rear portion 300 which emanates from the central pivot post 400. First turning to FIG. 1, a single rear connecting arm 310 emanates from the bottom end 402 of the central pivot post 400. Such single rear connecting arm 310 is of unibody construction and internally houses a plurality of gears sufficient to engage the peddle assembly 600 (in order to power the rear wheel 331). As shown, the rear connecting arm 310 is elliptical in cross section with an overall tubular construction.

The rear connecting arm 310 includes three primary arm sections. As shown in FIG. 2, the first arm section 311 attaches directly to the bottom end 402 of the central pivot post 400 (either via welding or through a single form extrusion of lightweight metal such as aluminum). A second arm section 312 connects at a downward angle to the first arm section 311. Preferably, the second arm section 312 has the same elliptical cross section and dimensions of the first arm section 311. In addition, such second arm section 312 has a recess 319 of sufficient size and dimension to help the rear connecting arm 310 clear the rear wheel 331. Lastly, the third arm section 313 emanates below the distal end of the second arm section 312. More specifically, this third arm section 313 is designed to house and integrate with the rear wheel assembly 330.

As further shown in FIG. 2, the rear wheel assembly 330 includes a rear wheel 331, a set of rear gears 332 affixed to the rear wheel 311, a rear brake 333 and a rear splash guard 334. The set of rear gears 332 communicates with the pedals 610 through the drive chain 640 to manually power the foldable electric bicycle 100. More specifically, the drive chain 640 connects the rear gears 332 (integrally maintained within the single rear connecting arm 310) to the front gears 630 positioned within the peddle assembly 600. While the invention contemplates that both the rear gears 332 and front gears 630 provide three torque settings (i.e., a three speed transmission), any number of gear settings can be used.

Sliding Seat Assembly of the Rear Portion

Both FIG. 1 and FIG. 2 further illustrate how the rear portion 300 further includes a sliding seat assembly 550. First turning to FIG. 1, the sliding seat assembly 550 is attached proximate to the top end 401 of the central pivot post 400. As shown, there are three primary components 101 of the sliding seat assembly 500. The first component 101 is the attached seat 551, which preferably includes some form of gel or sponge like top surface 552. Moreover, the attached seat 551 has two parallel independent plates 553 which mirror one another. Such parallel independent plates 553 conform to each portion of the user's buttocks for improved comfort and overall performance.

Located below the attached seat 551 is the second component of a sliding seat assembly 550: a positioning rod 560. The positioning rod 560 is preferably tubular in shape and has a top end 561 and corresponding bottom end 562. The attached seat 551 connects to the top end 561. In comparison, the bottom end 562 of the positioning rod 560 slides into and engages a circular clamp 570. Such circular clamp 570 is of a sufficient size and dimension so as to receive the bottom end 562. The circular clamp 570 connects to the distal end of a triangular connector 580.

The triangular connector 580 represents the third primary component of a sliding seat assembly 500. The triangular connector 580 includes a triangular middle bridge 580 having a front bridge end 581 and rear bridge end 582. The circular clamp 570 designed to engage the positioning rod 560 affixed to the rear bridge end 582. Correspondingly, the front bridge end 581 attaches to a top disk connector 590. The top disk connector 590 has a sufficient size and diameter to attach and mirror the top end 401 of the central pivot post 400.

Accordingly, the top disk connector 590 affixes (and is rotatable about) the central pivot post 400 which in turn connects to the triangular middle bridge 580 which includes a circular clamp 570 to hold the positioning rod 560. Optionally, the bottom of the triangular middle bridge 580 can include a handle 581 for purposes of maneuvering the rear portion 300 during use.

The Central Pivot Post

Both FIG. 1 and FIG. 4 illustrate, by way of example, the salient components 101 of the central pivot post 400. The central pivot post 400 has three primary functions. First, it has a sufficient size and dimension to hold and maintain the rechargeable battery 500 to power to the central control computer 240 and electric power train 260. Second, the central pivot post 400 is a central connecting point 404 for the front portion 200 and the rear portion 300 of the foldable electric bicycle 100. Such central connecting point 404 includes a swivel joint 405 which allows the front portion 200 to rotate proximate to the rear portion 300 for storage. As shown in FIG. 4, the central pivot post 400 also acts as a lockable handle 450 when the rear portion 300 and front port 200 rotated via the swivel joint 405. Such lockable handle 450 helps transport the foldable electric bicycle 100.

First turning to FIG. 1, the primary components of the central pivot post 400 preferably include a top end 401 and a corresponding bottom end 402. The top end 401 is essentially hollow and is tubular in size and construction. As shown, the top end 401 is welded/connected to the horizontal connecting shaft 210 of the front portion 200. Positioned above the top end 401 is the top disk connector 590 which maintains the triangular middle bridge 580 of the sliding seat assembly 550. A top handle portion 410 is affixed to the top end 401 opposite the horizontal connecting shaft 210. Such top handle portion 410 is essentially "L" shaped and includes a first grip 411 at its distal end.

As shown in FIG. 4, the bottom end 402 connects with first arm section 311 of the rear connecting arm 310. Positioned immediately below the swivel joint 405, the bottom end 402 is hollow and essentially tubular in shape and construction. A bottom handle portion 420, which mirrors the size and dimension of the top handle portion 410, is affixed to the bottom end 402 opposite the first arm section 311. Likewise, the bottom handle portion 420 is essentially "L" shaped and includes a second grip 421 at the distal end. Positioned below the bottom handle portion 420 is the peddle assembly 600.

Figure 10:
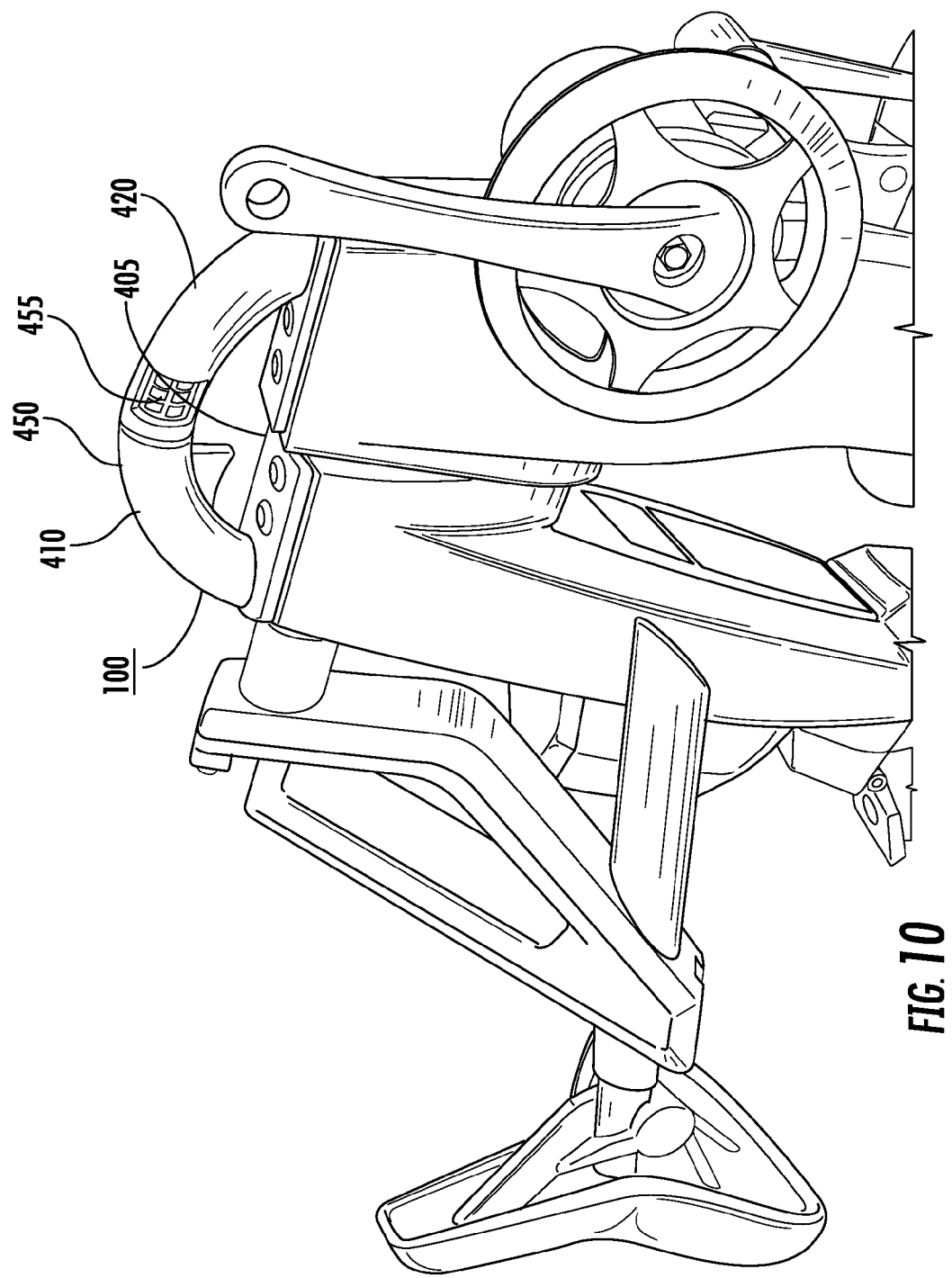
FIG. 10 is a perspective view illustrating the lockable handle.

As further illustrated in FIG. 10, both the top handle portion 410 and bottom handle portion 420 can be aligned employing the swivel joint 405 to rotate the front portion 200 proximate the rear portion 300. Upon achieving this orientation, both handle portions 410 and 420 form a lockable handle 450. As shown, the lockable handle 450 can include a combination lock 455 such that the handle portions 410 and 420 cannot be release from each other until a proper authentication code is provided. This provides an added safety feature such that unless a proper code is entered, the rear portion 300 cannot rotate about the swivel joint 405 to linearly align the foldable electric bicycle 100 for use.

Figure 11A:
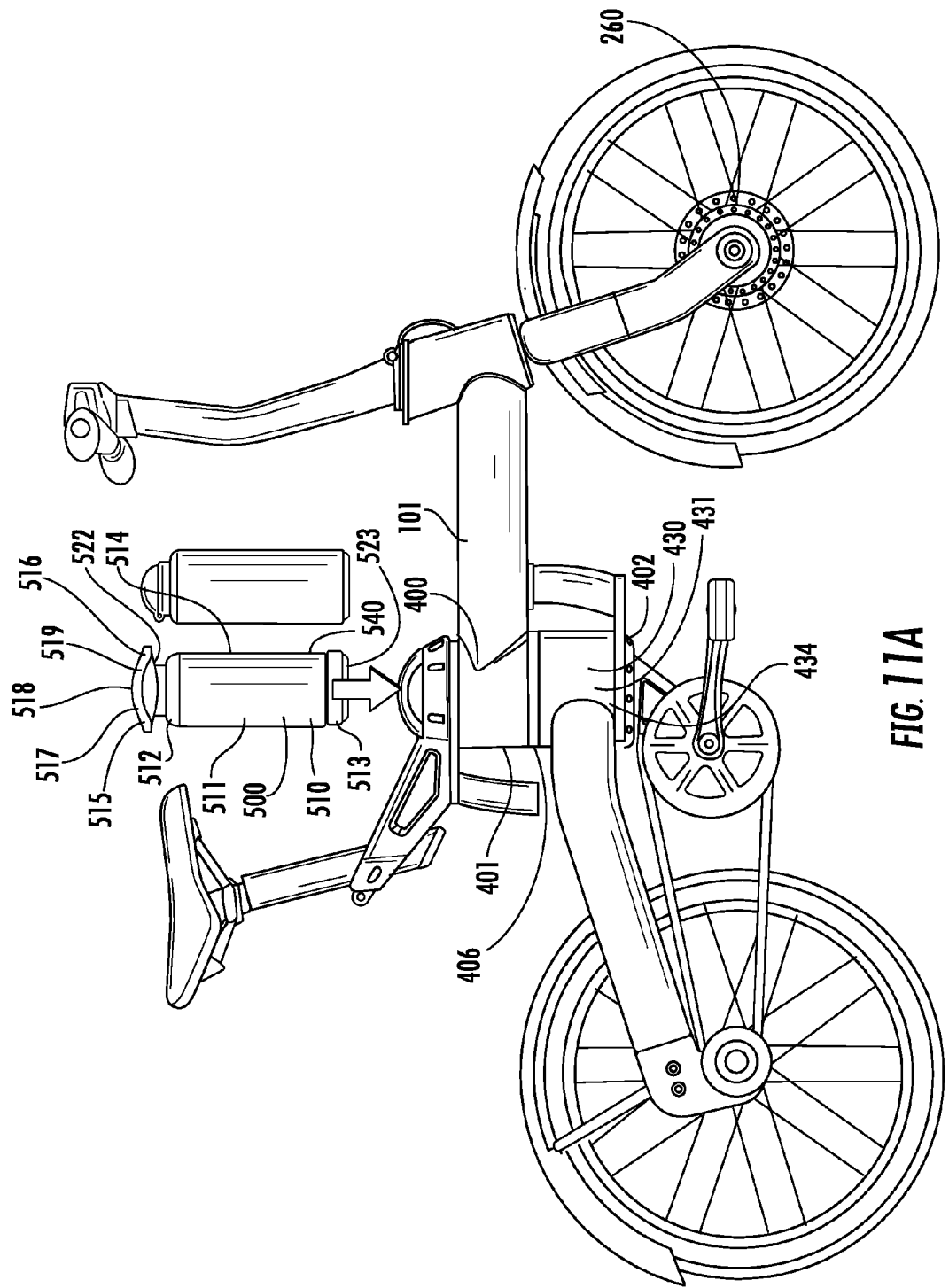
FIG. 11A is a view of the right side of the bicycle showing the cavity within the central pivot post to house the rechargeable battery.
Figure 11B:
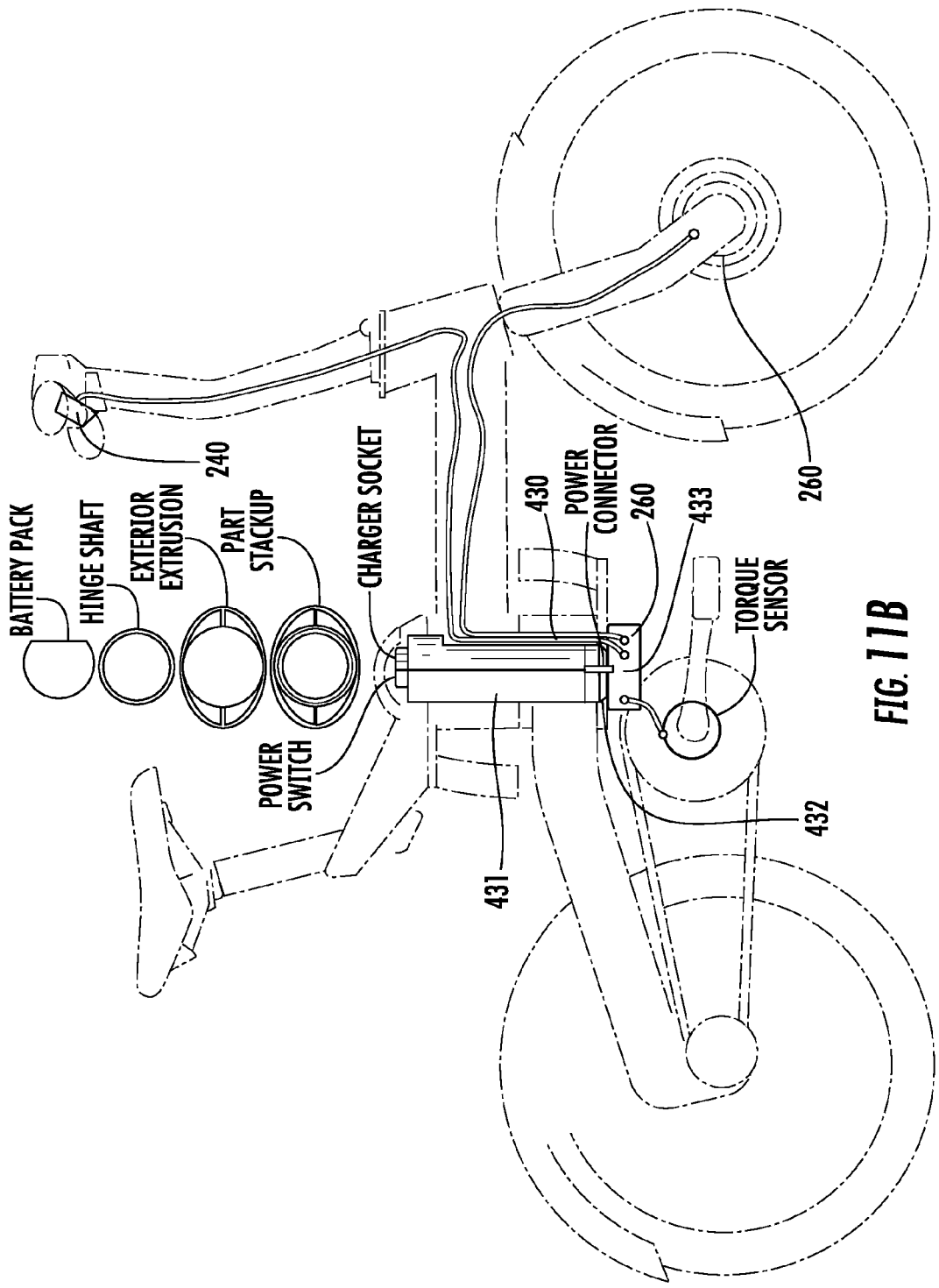
FIG. 11B is a view of the right side of the bicycle showing the various components of the rechargeable battery and control system.

As illustrated in FIGS. 11A and 11B, the top end 401, corresponding bottom end 402 and swivel joint 405 are hollow sufficient to form an internal cavity 430. The internal cavity 430 includes a tubular side wall 431 and a bottom cavity plate 432. Both the tubular side wall 431 and bottom cavity plate 432 have a sufficient size and dimension so as to receive the rechargeable battery 500. Axially centered in the bottom cavity plate 432 is the male plug 434 which receives electricity from the bottom of the rechargeable battery 500. This male plug 434 connects via a series of wires 215 to both the electric power train 260 and the central control computer 240.

The Rechargeable Battery

FIG. 11A illustrates, by way of example, the salient components 101 of the rechargeable battery 500. While the rechargeable battery 500 shown in the various figures is essentially tubular in shape and circular in cross section, it can be any size and configuration sufficient to fit within the central pivot post 400. The rechargeable battery 500 constitutes a significant portion of the overall weight of the foldable electric bicycle 100. By placing the rechargeable battery 500 within the central pivot post 400, this orientation helps align the primary weight of the foldable electric bicycle 100 with the girth and weight of the user to enhance turning stability and afford greater overall performance.

The rechargeable battery 500 supplies the power required by the foldable electric bicycle 100 including, but not limited to, the central control computer 240 and the electric power train 260 (for purposes of turning the electric motor 261). The rechargeable battery 500 is of two part construction having an exterior casing 510 (which creates a rigid outer canister housing 511) as well as an interior battery chemical 540. While any known battery chemical 540 may be used within the rechargeable battery 500, such material is preferably some type of lithium ion battery, such as lithium phosphate.

The exterior casing 510 has three primary functions. First, the rigid exterior canister housing 511 both maintains and secures the battery chemical 540 to prevent leaking and exposure by the user. Second, the exterior casing 510 secures and locks the rechargeable battery 500 into the central pivot post 400 to prevent theft, due to the high cost of the battery chemical 540. Third, the exterior casing 510 also turns on the electrical components 101 of the foldable electric bicycle 100, including the central control computer 240 and the electric power train 260.

To accomplish this varied functionality, the exterior casing 510 includes a top cap 512, a bottom cap 513 and a tubular sheath 514 which form the rigid outer canister housing 511. The top cap 512 includes several components 101 to aid in the overall functionality of the rechargeable battery 500. First, the top cap 512 includes an outer lip 515 that includes a flange 516 having a diameter greater than the tubular sheath 514. The flange 516 extends over both (a) the top end 401 of the central pivot post 400, and (b) the top disk connector 590 of the sliding seat assembly 500. Accordingly, the user recognizes the rechargeable battery 500 is in a correct position when the flange 516 rests upon (and is flush with) the top end 401 of the central pivot post 400.

The top cap 512 also includes a rotatable handle 517. When positioned in an upright position, the rotatable handle 517 functions to remove the rechargeable battery 500 from the central pivot post 400 for either remote charging or replacement with another (charged) rechargeable battery 500. Moreover, an upright rotatable handle 517 can likewise help guide the rechargeable battery 500 when inserting it into the central pivot post 400 during installation to ensure engagement to supply power. When positioned within the top cap 512 the rotatable handle 517 allows exposure of the various components 101 found on top of the rigid exterior canister housing 511.

Also located on the outer lip 515 of the top cap 512 is a key enabled lock 518. There are two primary functions of the key enabled lock 518. First, when a key 519 is turned, the key enabled lock 518 causes a lock member 521 to release from the tubular sheath 514 to engage the interior cavity 430 of the central pivot post 400. This helps affix the rechargeable battery 500 within the central pivot post 400. Accordingly, when in a locked position, the key enabled lock 518 ensures the rechargeable battery 500 cannot be removed. This acts not only as a theft deterrent, but more importantly a safety feature. For example, if the key enabled lock 518 goes from a locked to unlock position during use, the power assist functionality is disengaged.

Yet another component 101 positioned on the top cap 512 is an on/off switch 522. Then the key enabled lock 518 is in a locked position, the rechargeable battery 500 allows for a user to engage (i.e., turn on) the on/off switch 522. Upon engaging the on/off switch 522, the rechargeable battery 500 sends power to both the central control computer 240 and the electric power train 260. Finally, an electric input 514 is located on the top cap 512 to recharge the rechargeable battery 500. The foldable electric bicycle 100 can be charged when in non-use without need to remove the rechargeable battery 500 from the central pivot post 400. The top cap 512 can further include a variety of gauges, including but not limited to a digital read out which provides the level of charge remaining on the rechargeable battery 500. Such gauges can include the same or similar functionality found within the central control computer 240.

In addition to the various components of the top cap 512, the corresponding bottom cap 513 likewise includes certain functionality. First, the bottom cap 513 has a sufficient size and dimension so as to engage the bottom cavity plate 434 of the interior cavity 430 of the central pivot post 400. Such orientation allows the rechargeable battery 500 to be cradled within the central pivot post 400 throughout use of the foldable electric bicycle 100. Second, the bottom cap 514 also includes a female two-prong receiver 523. Such female two-prong receiver 523 engages with the male plug 434 positioned on the bottom cavity plate 434 of the central pivot post 400. By engaging with the male plug 434 the rechargeable battery 500 connects to the various wires 215 necessary to power the components 101 of the foldable electric bicycle 100.

The Peddle Assembly and Peddle Assist

Both FIG. 9 and FIG. 11B illustrate, by way of example, the peddle assembly 600. First turning to FIG. 9, the peddle assembly 600 functions to provide manual (peddle) power to the rear wheel 331 via the drive chain 640. As further explained below, the peddle assembly 600 also helps sense whether to engage the electric power train 260.

First turning to FIG. 9, the peddle assembly includes two sets of pedals 610: a first peddle 611 and a corresponding second peddle 612. Both peddles 610 connect to each other via a central axis pin 620. Each peddle 610 includes a retractable footrest 613. The retractable footrest 613 includes an upper portion 614 and lower portion 615 and a spring loaded swivel point 616. Such swivel point 616 simultaneously retracts both the upper portion 614 and the lower portion 615 to reduce their overall size.

The front gears 630 are affixed to one side of the central axis pin 620. The front gears 630 connect to the drive chain 640 to manually power the vehicle. At least a portion of the central axis pin 620 is maintained by an outer peddle shaft 650. The outer peddle shaft 650 directly attaches to the bottom end 402 of the central pivot shaft 400.

Positioned within or proximate the outer peddle shaft 650 is a peddle assist sensor 660. The peddle assist sensor 660 communicates via a wire 215 (maintained within the horizontal shaft 210) with the central control computer 240, the electric drive train 260 and the rechargeable battery 500. Accordingly, when the user engages the electric drive train 260 via the central control computer 240, the peddle assist sensor 660 denotes when the user is peddling, in order to receive electricity from the rechargeable battery 500 to power the electric motor 261.

The Method of Folding

The invention further contemplates a method of folding a foldable electric bicycle 100 for both transport and later stowage while the bicycle is not in use. As shown in FIG. 5, through specific rotation and pivoting of both the front portion 200, rear portion 300 and other components 101 the foldable electric bicycle 100 greatly reduces in overall size and dimension. As further shown, such folding aligns a top handle portion 410 with a bottom handle portion 420 to form a lockable handle 450. As shown, the lockable handle 450 can include a combination lock 455 such that the handle portions 410 and 420 cannot be separated without entry of a proper combination.

The method of folding first includes the step of rotating a front portion 200 about a rear portion 300 through use of a swivel joint 405 located within a central pivot post 400. Such central pivot post 400 is capable of maintaining a rechargeable battery 500 having a top end 401 that connects to the front portion 200 and a bottom end 402 which connects to the rear portion 300. Preferably, the front portion 200 includes a front wheel assembly 250 having a front wheel 254 and electric power train 260. Likewise, the rear portion 300 includes a rear connecting arm 310 which maintains a rear wheel 331.

The second step is to pivot a telescoping steering column 220 proximate the front wheel 254. The telescoping steering column 220 may be attached to the front portion 200 and includes a releasable hinge connector 228 positioned at a bottom end of the telescoping steering column 220. Next, the method contemplates stowing a gel seat 551 within a sliding seat assembly 550 positioned on the central pivot post 400 through twisting the sliding seat assembly 550 about the central pivot post 400 and then toggling the seat proximate the rear portion 300 through use of a positioning rod 560 attached to the sliding seat assembly 550.

The method can include two additional steps to help further reduce the size and bulk of the foldable electric bicycle 100 for transport and later stowage. One optional step is reducing a handle bar system 230 located on top of the telescoping steering column 220 through use of a releasable hinge connector 228. The contemplated releasable hinge connector 228 has a left handle rod 236 which connects to the center rod 231 through a first spring loaded hinge 237 as well as a right handle rod 238 that connects to the center rod 231 through a second spring loaded hinge 239.

The second optional step includes retracting each retractable footrest 613 positioned within each peddle 610 of a peddle assembly 600 positioned below the central pivot post 400. Here, each retractable foot rest 613 includes an upper portion 614 and a lower portion 615 both connected to a spring loaded swivel point 616. Each spring loaded swivel point 616 is capable of simultaneously twisting both the upper portion 614 and lower portion 615 toward the peddle assembly 60.

We claim:

1. A foldable electric bicycle, comprising:
   a front portion having a horizontal shaft that maintains a telescoping steering column having a handle bar assembly, as well as a front wheel assembly that includes a front wheel and electric power train;
   a rear portion having a single rear connecting arm which maintains a rear wheel;
   a central pivot post including a top end, a bottom end, and a swivel joint, wherein the top end connects to the horizontal shaft, and wherein the bottom end connects to the rear connecting arm and a peddle assembly, wherein the front portion is horizontally rotatable about the central pivot post via the swivel joint for placement of the front portion proximate the rear portion when the foldable electric bicycle is in a folded orientation;
   a top handle portion which connects with the top end opposite the horizontal shaft and a bottom handle portion which connects with the bottom end opposite the rear connecting arm, wherein the top handle portion and the bottom handle portion are collectively structured to form a lockable handle when the foldable electric bicycle is in the folded orientation;
   a rechargeable battery of a sufficient size and dimension to be positioned in a cavity within the central pivot post, the rechargeable battery capable of providing electricity to the electric power train.

2. The bicycle of claim 1, wherein the peddle assembly having a set of peddles connected to each other via a central pin that includes front gears capable of engaging a drive chain which communicates with rear gears attached to the rear wheel.

3. The bicycle of claim 2, further comprising a central control computer which communicates with the rechargeable battery.

4. The bicycle of claim 3, wherein the peddle assembly includes a peddle assist sensor capable of determining whether a user is rotating the set of peddles in order to send a signal to the central control computer to engage the electric power train.

5. The bicycle of claim 1, further comprising a sliding seat assembly having a gel seat adjustably attached to a top end of a positioning bar.

6. The bicycle of claim 1, wherein the rechargeable battery includes a top plate having an upper lip capable of resting upon the top end of the central pivot post, the top plate further including a rotatable handle to remove and return the rechargeable battery.

7. The bicycle of claim 1, wherein the rechargeable battery also includes a key enabled lock that secures the rechargeable battery to the central pivot post.

8. The bicycle of claim 1, further comprising a handle bar system including a central rod that includes a pair of cable brakes which communicate with both the front wheel and the rear wheel, as well as a multi-speed throttle which communicates via a wire to the front gear of the peddle assembly.

9. The bicycle of claim 8, wherein the handle bar system includes a handle bar folding assembly that connects to the central rod, the handle bar folding assembly having a left handle rod having a first bumper at a distal end of the left handle rod which connects to the central rod through a first spring loaded hinge as well as a right handle rod having a second bumper at a distal end of the right handle rod that connects to the central rod through a second spring loaded hinge, wherein a release switch positioned on the central rod engages both spring loaded hinges to position and align both handle rods in relation to the center rod.

10. A method of folding an electric bicycle, the method comprising the steps of:
    horizontally rotating a front portion having a horizontal shaft proximate a rear portion having a rear connecting arm through use of a swivel joint located within a central pivot post, the central pivot post capable of maintaining a rechargeable battery and having a top end that connects to a top handle portion and the front portion, wherein the top handle portion connects with the top end opposite the horizontal shaft, and a bottom end that connects to a bottom handle portion and the rear portion, wherein the bottom handle portion connects with the bottom end opposite the rear connecting arm, wherein the top handle portion and the bottom handle portion collectively form a lockable handle when the front portion is proximate the rear portion;
    pivoting a telescoping steering column proximate the front wheel, the telescoping steering column being attached to the front portion and having a releasable hinge connector positioned at a bottom end of the telescoping column; and
    stowing a seat within a sliding seat assembly positioned on the central pivot post through twisting the sliding seat assembly about the central pivot post and then toggling the seat proximate the rear portion through use of a positioning bar attached to the sliding seat assembly.

11. The method of claim 10, further comprising the steps of:
    reducing a handle bar assembly located on top of the steering wheel column through use of a releasable hinge connector having a left handle rod which connects to the center rod through a first spring loaded hinge as well as a right handle rod that connects to the center rod through a second spring loaded hinge; and
    retracting each retractable footrest positioned within each peddle of a peddle assembly positioned below the central pivot post, each retractable foot rest including an upper portion and a lower portion both connected to a spring loaded swivel point, such spring loaded swivel point capable of simultaneously twisting both the upper portion and lower portion toward the peddle assembly.

* * * * *